March 21, 1961  J. F. JOHNSON  2,976,108
PORTABLE OSCILLOGRAPH
Filed Feb. 20, 1959  2 Sheets-Sheet 1

INVENTOR.
James F. Johnson
BY
Adams, Forward and McLean
ATTORNEYS

March 21, 1961  J. F. JOHNSON  2,976,108
PORTABLE OSCILLOGRAPH
Filed Feb. 20, 1959  2 Sheets-Sheet 2
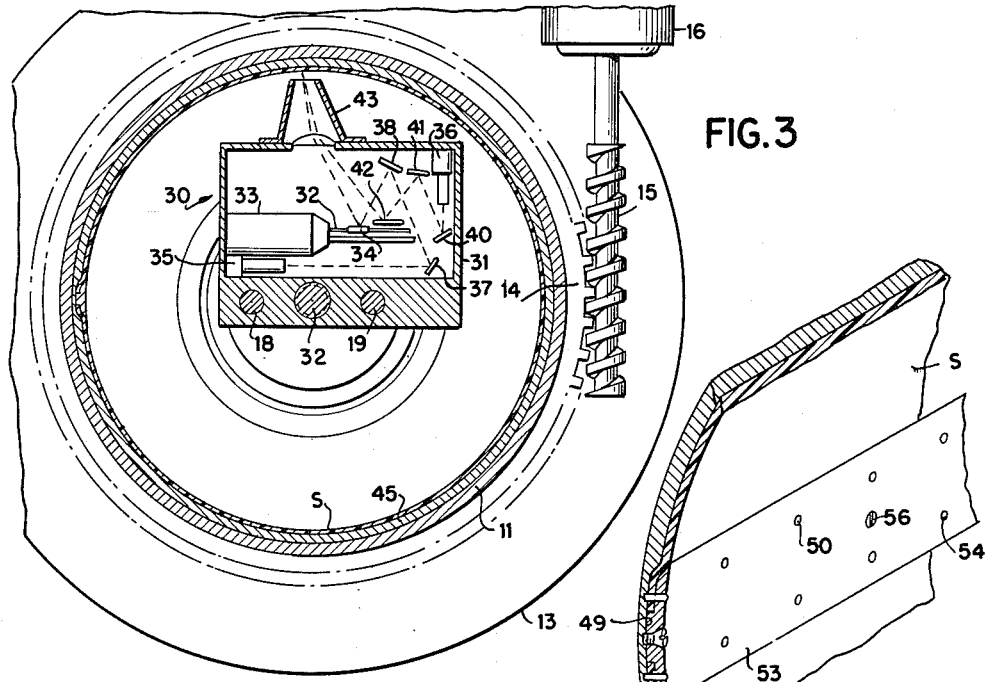
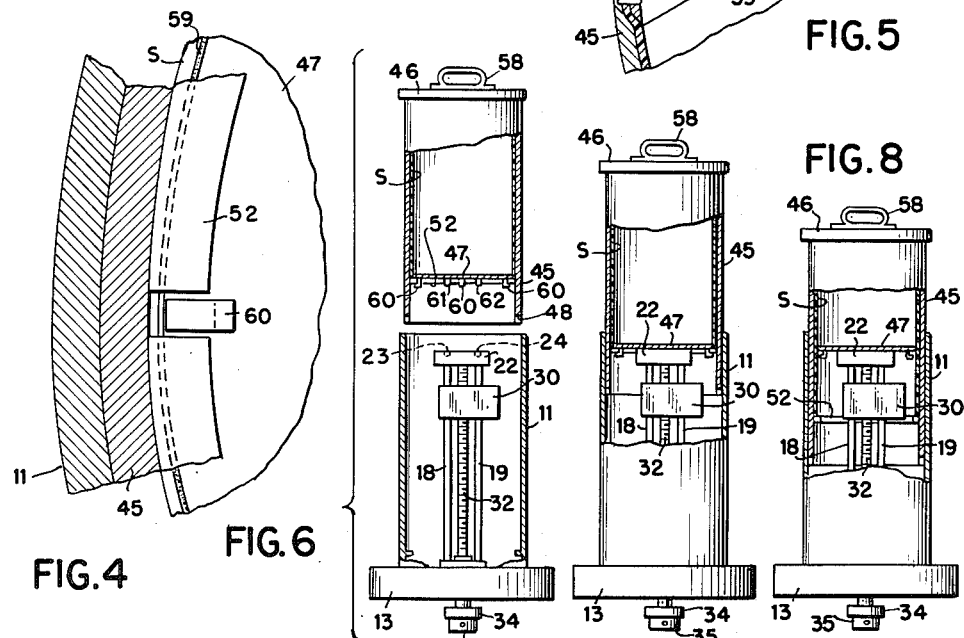
INVENTOR.
James F. Johnson
BY
Adams, Forward and McLean
ATTORNEYS United States Patent Office 2,976,108
Patented Mar. 21, 1961

2,976,108

PORTABLE OSCILLOGRAPH

James F. Johnson, Tulsa, Okla., assignor to Sinclair Oil & Gas Company, Tulsa, Okla., a corporation of Maine Filed Feb. 20, 1959, Ser. No. 794,698

6 Claims. (Cl. 346—109)

My invention relates to graphical recording of transient electrical signals and in particular provides an improved oscillograph construction for graphical reproduction of a number of such transient electrical signals in side by side arrangement. The oscillograph construction provided by my invention is particularly suitable for preparing seismic cross-sections.

In the analysis of seismic data obtained by seismic prospecting methods, particularly where seismic reflection data are taken at a number of points along a profile, it has been found useful to construct what is known as a seismic cross section, in which the individual seismic records in a graphical form are positioned in side by side relation to permit correlation of related seismic events found in more than one such record. Conventionally, this has been done by pasting the familiar "wiggle trace" records side by side on a common mounting board adjusting the positions of each such record to provide proper correlation in time. More recently, machines have been developed for photographically reproducing such seismic records on a common sheet of photosensitive material. Such machines as are available today, however, are rather large and not readily portable.

It is a particular object of my invention to provide an oscillograph suitable for preparing seismic cross-sections on a single sheet of photosensitive material in which such oscillograph will be relatively small in size, facilitating its portability such that it can be readily moved from one field office to another and yet which is capable of preparing seismic cross-sections of sufficient size to permit an entire day's work of one seismic crew to be reproduced in cross-section form on a single sheet of photosensitive material.

It is another object of my invention to provide such an oscillograph in which provision is made for daylight loading of the oscillograph.

The oscillograph of my invention includes a slide mount along which an optical system including a bank of mirror galvanometers can be moved to any desired position. The slide mount, which is preferably upright, is positioned inside a barrel which also is preferably upright. The barrel is rotatable about the slide mount and can be closed at each end to provide a light-tight camera enclosure. The optical system is arranged such that in any position on its slide mount the light beams thrown by the various galvanometer mirrors come into focus approximately at the inner surface of the barrel, and the barrel is arranged to receive a cylindrical roll of photosensitive paper, film or the like on its inner surface. Thus, the galvanometer bank and optical system beginning at one end of the slide mount can be utilized by rotating the barrel to expose a first group of seismograms at one end of the film. After the first exposure the optical system can then be moved along the slide mount to a second position adjacent the first to expose a second series of traces on the film adjacent the first series. Such stepwise movement is repeated along the length of the slide mount until the film or other photosensitive sheet is completely exposed. Timing mechanisms, of course, are employed to provide alignment of the starting points of exposure of each set of traces. In making an exposure the film receiving barrel can be continuously rotated with the exposure timed for a particular cycle of rotation. Alternatively, with the optical system properly positioned for starting an exposure, the barrel can be given a single rotation during which the exposure is made. The former arrangement will, of course, minimize variations in speed of exposure from one set of traces to the next and also during any single exposure cycle. The latter method, however, somewhat simplifies the mechanics of synchronization.

In order to facilitate daylight loading of the oscillograph of my invention, the cylindrical sheet of photosensitive film or paper can be separately stored in a closed magazine which is insertable into the barrel to position the film or paper for exposure. To accomplish this, the magazine should include a tube for retaining the sheet of film or paper on its inner surface. One end of the tube is capped, and the other end of the tube is provided with a plug-type closure in order to prevent light from entering the sleeve and exposing the film or paper. In this arrangement the plug can be unlocked, for example, by rotational movement, to free it to move lengthwise within the tube toward the capped end of the magazine tube. To install the magazine the plugged end of the tube is inserted into an end of the camera barrel to a position in which the plug engages one end of the slide mount for the optical system. A twist then unlocks the plug and the remainder of the tube is pushed into the camera barrel, thus inserting the tube and retained film or paper into the barrel to a position extending about the slide mount. At the same time the slidable plug in the magazine is advanced by engagement with the slide mount toward the capped end of the magazine substantially uncovering the film or paper with respect to the optical system. The cap and plug of the magazine thus serve to close the open end of the camera barrel through which the magazine was inserted. After the film is exposed, as described above, the magazine is then removed in the reverse manner. Since the plug is engaged with the end of the slide mount for the optical system the plug is withdrawn across the face of the film as the magazine is withdrawn from the barrel until the plug is completely past the film and returned to its original position. Angular movement of the magazine relative to the slide mount is then employed to relock the plug closing the magazine.

For a more complete understanding of the practical application of the principles of my invention, reference is made to the appended drawings in which:

Figure 3 is a cross-sectional view taken at line 3—3 in Figure 1;

Figure 4 is an enlarged fragmentary cross-section taken at line 4—4 in Figure 1;

Figure 5 is an enlarged fragmentary perspective view of a portion of the apparatus shown in Figure 1; and Figures 6, 7 and 8 are diagrammatic vertical sections of the apparatus shown in Figure 1 illustrating in conjunction with each other the final method of assembly of the apparatus.

Figure 1:
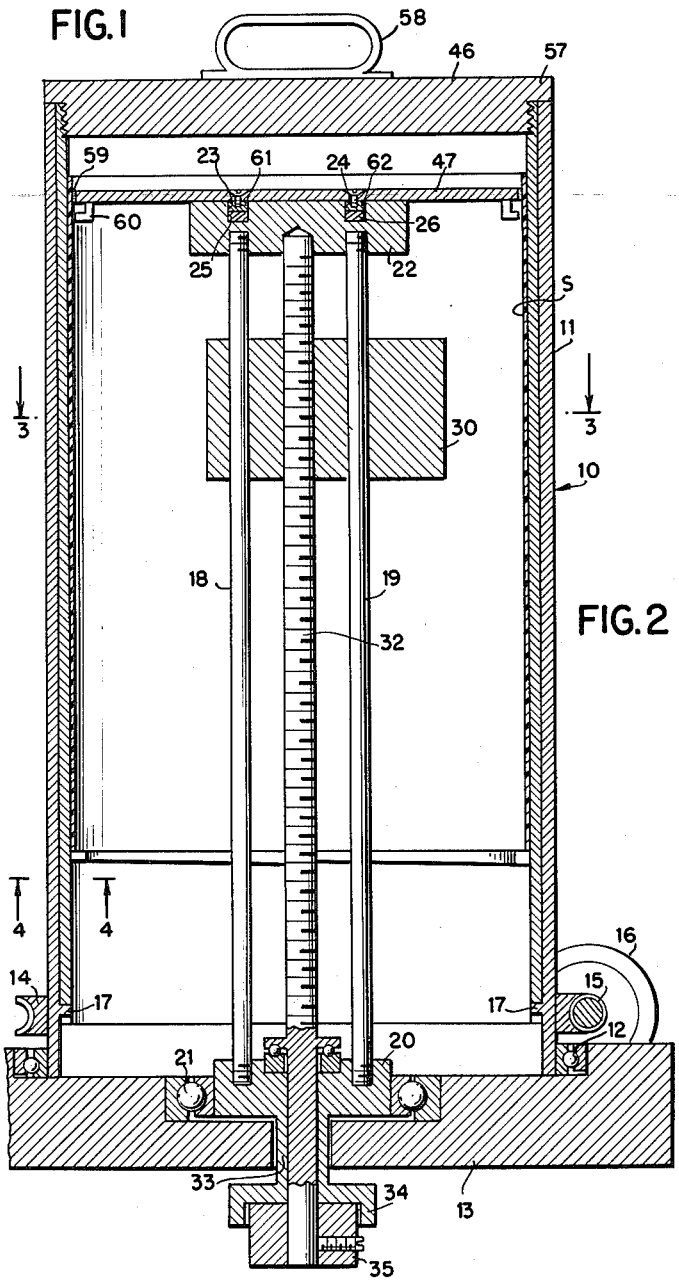
Figure 1 is a vertical section of an oscillograph constructed in accordance with the principles of my invention.
Figure 2:
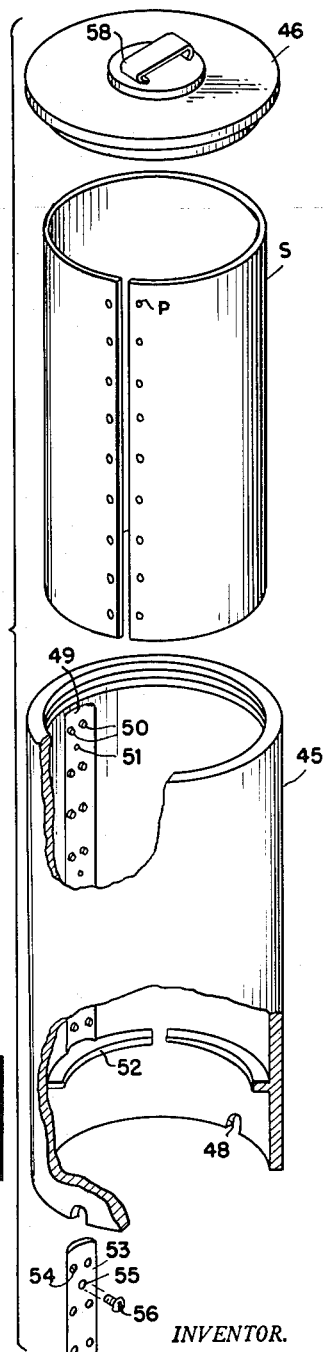
Figure 2 is an exploded, partially sectioned, perspective view of a portion of the apparatus shown in Figure 1.

In the drawings the reference numeral 10 designates a barrel-type oscillograph, i.e., camera, constructed in accordance with my invention which, referring more particularly to Figures 1 and 2, includes a vertical film receiving barrel 11 of generally cylindrical form which is mounted upright and received at its lower end in bearings 12 on the upper face of a base 13. Bearings 12 are positioned to permit rotation of barrel 11 about a vertical axis. Adjacent its lower end, the exterior of barrel 11 is encircled with a series of gear teeth 14 arranged to engage a worm gear 15 (see also Figure 3) on the output shaft of a motor 16 mounted on base plate 13 such that rotation of worm 15 will cause barrel 11 to rotate in bearings 12 about its vertical axis. Also adjacent its lower end barrel 11 is provided with several short studs 17 spaced at intervals about its interior. The upper face of base plate 13 is recessed to receive a short length of the lower end of barrel 11 in order to increase the light-tightness of the closure of barrel 11 against base plate 13. Suitably, of course, the entire inner surface of barrel 11 is blackened.

A pair of vertical slide rods 18 and 19 are mounted upright on base plate 13 within barrel 11. Slide rods 18 and 19 more particularly are affixed at their lower ends in a block 20 which is mounted in the upper surface of base plate 13 by means of bearings 21 for rotation coaxially with barrel 11. The upper ends of slide rods 18 and 19 terminate a short distance below the upper end of barrel 11 in a crosshead 22 in which they are affixed. The top side of crosshead 22 is provided with a pair of short vertical bores 23 and 24 in the lower ends of which are affixed small permanent magnets 25 and 26. The transverse dimensions of the assembly of slide rods 18 and 19, block 20 and crosshead 22 are substantially less than the interior transverse dimensions of barrel 11.

The optical system generally denoted by the reference numeral 30 is housed within a closed box 31 which is slidably received on slide rods 18 and 19 to permit box 31 to be moved vertically within barrel 11 on slide rods 18 and 19. A threaded shaft 32, which is positioned coaxially within barrel 11 extending through block 30 and terminating in a rotating journal in crosshead 22, passes through a portion of box 31 which it threadedly engages.

Thus, vertical movement of optical system 30 within barrel 11 can be accomplished by rotating shaft 32. To facilitate this (see Figure 1), a sleeve-like extension 33 is provided on the lower end of block 20 through which the lower unthreaded end of shaft 32 slidably extends. Both the coaxial sleeve extension 33 and shaft 32 thus extend through base plate 13 and at their lower ends terminate in manual controls to permit rotation of slide rods 18 and 19, optical system 30 and shaft 32 as a unit by rotation of a wheel 34 affixed to the lower end of block 20 and to permit rotation of shaft 32 relative to slide rods 18 and 19 by means of a wheel 35 affixed to the lower end of shaft 32.

Referring more particularly to Figure 3, optical system 30, which is housed within box 31, includes a bank of mirror galvanometers 32 which are mounted in a common magnetic block 33. This unit is available commercially and usually consists of 24 separate galvanometer units, the armatures of which include shafts projecting from one side of block 33. The shafts are parallel, and each carries a separate mirror 34. In the illustrated arrangement galvanometer block 33 is positioned such that the armature shafts are rotatable on horizontal axes and are vertically aligned with one another. Within box 31, in addition to the galvanometer unit itself, is a pair of projection lamps 35 and 36. Each lamp 35, 36 includes a suitable vertical slit positioned to allow light from lamps 35, 36 to be projected horizontally.

Thus, the beam of light which is projected has a substantial vertical dimension. The light beam projected from lamp 35 is reflected by means of a pair of mirrors 37 and 38 positioned within box 31 to impinge along the twenty-four mirrors 34 extending from galvanometers 32. Mirrors 34 thus separately intercept the beam of light from lamp 35 and each reflects its own separate ray which is directed through a vertically positioned cylindrical lens 39 in the wall of box 31 facing the inner surface of barrel 11.

The beam of light from lamp 36 which similarly has a substantial vertical dimension is reflected through a series of mirrors 40, 41 and 42 positioned within box 31 to the same cylindrical lens 39. The adjustment of the various reflecting elements of the optical system within box 31 is such that the rays of light reflected by mirrors 34 and the beam of light from lamp 36 as they issue from box 31 through lens 39 are brought into a common focal line outside of box 31 and a short distance from the inner wall of barrel 11. This distance, as will be illustrated later, is adjusted such that the focal line is on the surface of the photosensitive material to be exposed. A hood 43 is provided on the exterior of box 31 enclosing lens 39 and extending to a small opening closely adjacent the focal line. The principal purpose of hood 43, of course, is to reduce stray reflections which might cause clouding and other imperfections in the finally developed film or paper.

Referring more particularly to Figure 2, oscillograph 10 is loaded with a sheet S of photosensitive material which is provided with a series of equally spaced marginal perforations P along its opposite ends. Sheet S is loaded within barrel 11 around its inner wall by means of a magazine which includes an open-ended tube 45 which fits within barrel 11, a cap 46 and a plug 47.

Tube 45 has an external diameter just less than the internal diameter of barrel 11 and is almost equal in length to barrel 11. Specifically, tube 45 is at its lower end provided with a number of end slots 48 which are positioned to be received on studs 17 in barrel 11 to support tube 45 engaged with barrel 11. In this position (see also Figure 1) the upper end of tube 45 is flush with the upper end of barrel 11. Along its inner surface tube 45 (see also Figure 5) is provided throughout most of its length with a shallow recess 49. Within recess 49 extending lengthwise of tube 45 are two rows of short studs 50 which are spaced lengthwise to correspond with the spacing of perforations P on sheet S. The two rows of studs 50 are positioned closely adjacent and each stud 50 in one row is aligned horizontally with a stud 50 in the other row. Between the rows of studs 50 groove 49 is also provided with a row of tapped bores 51, four such bores being provided. Tube 45 is also provided with four internal annular flange segments 52 extending at arcuate intervals about its interior surface adjacent the slotted end of tube 45. Tube 45 is further provided with a clamp bar 53 which is sized to fit within recess 49, and which is provided with apertures 54 to receive studs 40 and with apertures 55 aligned with bores 51 in recess 49. Clamp bar 53 is further shaped substantially to fill recess 49 (see particularly Figure 5) with its inner surface (facing toward the open center of tube 45) forming a smooth uninterrupted portion of the cylindrical wall of tube 45. Thumb screws 56 are provided to extend through apertures 55 in bar 53 and threadedly engage bores 51 to hold bar 53 in position.

Cap 46 is shaped to be received partially in the upper end of tube 45 in threaded engagement with tube 45 with a shoulder 57 on cap 46 overlying the upper end of tube 45 providing a tight, light-proof closure (see Figure 1). Cap 46 is also provided on its upper side with a fixed handle 58 to facilitate threading cap 46 into the upper end of tube 45 and also to facilitate manipulation of the entire magazine assembly.

Referring specifically to Figure 1, plug 47 is a flat circular disk shaped for a smooth sliding fit in the interior of tube 45. The rim of plug 47 is provided with felt or other light-proofing material as indicated by the reference numeral 59 to assure a light-tight closure between plug 47 and the interior of tube 45. Plug 47 on its under side is provided with four wedging lugs spaced at intervals to fit between flange segments 52 (see also Figure 4)

such that by subsequent turning lugs 60 will wedge under segments 52 and secure plug 47 tightly against flange segments 52 in a bayonet-type locking arrangement. The under side of plug 47 is also provided with a pair of depending studs 61 and 62.

Referring more particularly to Figures 2 and 5, the magazine is assembled by first coiling sheet of film S to slip it within tube 45, perforations P on opposite margins being located adjacent recess 49. The perforated margins of film S are then pushed into recess 49 to cause perforations P to receive studs 50. Ideally, as sheet S is slipped over studs 50 there is a slight space between the abutting margins of sheet S exposing tapped bores 51. Also, in this position sheet S should lie snugly against the inner surface of tube 45 with its lower end resting on flange segments 52, and with its upper end just below the threads on the inside of the upper end of tube 45. Bar 53 is then placed over the abutting margins of sheet S with recess 54 receiving studs 50, and set screws 56 are then installed to clamp bar 53 tightly down over the abutting margins of sheet S, thereby securing film S in position. Plug 47 is then inserted into the upper end of tube 45, with lugs 60 facing downwardly, to a position resting on segments 52 with lugs 60 falling in the spaces between segments 52. Plug 47 is then rotated to wedge lugs 60 underneath flange segments 52 to lock plug 47 in position and at the same time provide a light-tight closure for the lower end of tube 45. Finally, the magazine assembly is closed by threadedly engaging cap 46 on the upper end of tube 45. After this initial assembly it will be apparent, of course, that the magazine loaded with film S can be removed from the darkroom and stored in any convenient place. As a practical matter it may prove desirable to have a number of such loaded magazines on hand at one time.

The oscillograph of my invention can then be employed to prepare seismic cross-sections in the following manner. Barrel 11 is first loaded by placing the loaded magazine assembly above the upper end of barrel 11, as shown in Figure 6, with slots 48 directed into barrel 11. Tube 45 of the magazine is then lowered into the upper end of barrel 11 to a position at which plug 47 abuts crosshead 22 as shown in Figure 7. It will be noted that bores 23, 24 in crosshead 22 are spaced apart and sized to receive studs 61 and 62 on the under side of plug 47 with magnets 25 and 26 aiding in a sure seating of plug 47 on crosshead 22. Tube 45 is then rotated to unwedge lugs 60 from beneath flange segments 52. At this point it will be observed that by reason of the insertion of the lower end of tube 45 into barrel 11 removal of the light-tight closure for the interior of tube 45 provided by plug 47 will not cause exposure of film S. In this regard to facilitate a light-tight seal between the lower end of tube 45 and the upper end of barrel 11, felt or other light-proof material for sliding joints can be provided about the upper interior end of barrel 11. Upon the rotation of tube 45 lugs 60 are, of course, released from their bayonet-type engagement with segments 52 and plug 47 is then free to slide upwardly in tube 45, as the latter is lowered into barrel 11, as shown in Figure 8. Plug 47, in the meantime, of course, remains firmly seated on crosshead 22. As tube 45 is lowered to bottom in barrel 11, slots 48 are received on studs 17 to support tube 45 firmly within barrel 11 and engage tube 45 to rotate with barrel 11. At the same time the shoulder portion 57 on cap 46 rests on the upper end of barrel 11 as shown in Figure 1.

With oscillograph 10 thus loaded and with a suitable seismic recording ready to be reproduced, optical assembly 30 is raised to a top position within barrel 11 by rotating wheel 35 relative to wheel 34 to cause shaft 32 to turn within slide rods 18 and 19 in a direction raising assembly 30. When assembly 30 is at the top position motor 16 is turned on. At the same time the seismic recording, typically a magnetic recording mounted on a revolving drum for rotation past pick-up head, is mounted on its play-back device, which is operating repetitively to reproduce the seismic recording as an electrical signal, or in a typical case as twenty-four separate electrical signals with a twenty-fifth electrical signal indicating time. The cyclic rate of reproduction of the recording is then synchronized with the cyclic rate of rotation of barrel 11 as the latter is driven by motor 16 by worm 15 and gear 14. Wheel 34 is revolved together with wheel 35 to a position such that hood 43 on assembly 30 approximately lines up with bar 53 simultaneously as the pick-up heads on the magnetic recording play-back drum pass the abutting end margins of the magnetic recording film. The electrical outputs of the pick-up heads reproducing the twenty-four seismic channels are electrically connected to drive galvanometers 32 but projection lamps 35 and 36 are unenergized as yet. A potential circuit is provided between the twenty-fifth output from the magnetic recording, that is, the timing line recording, to lamp 36. This potential circuit and energizing circuits for lamp 35 are both arranged to be closed simultaneously during a single revolution of drum 11 (and of the magnetic recording play-back device) commencing with the time break on the recording or a few milliseconds before such time break and terminating at the end of the reproduction of the record in that cycle of reproduction. Such timing methods, of course, are well known in the oscillograph art and need no further explanation here. The energizing of the lamps thus provides a series of twenty-four traces exposed in parallel arrangement on film S about its upper end. Simultaneously the flashing of lamp 36 under the control of the time channel on the original recording will provide transverse time lines on the exposed area of sheet S. Barrel 11 is then stopped from rotation by turning off motor 16. Optical assembly 30 is then lowered to a position adjacent its original position, and the process repeated for a new seismogram until the entire sheet S has been exposed.

After sheet S has been entirely exposed or whenever it is desired to develop film S the magazine assembly is removed from barrel 11 by the reverse procedure from that by which it was installed, that is, tube 45 is withdrawn from the upper end of barrel 11. Magnets 25 and 26, as shown in Figure 8, cause plug 47 to remain seated on crosshead 22 and thus plug 47 is withdrawn to the lower end of tube 45 as the latter is withdrawn from barrel 11. Eventually plug 47 seats on flange segments 52 in the position shown in Figure 7 and at this point withdrawal of tube 45 is ceased. Rotation of tube 45 then permits lugs 60 to align between segments 52, and further rotation wedges lugs 60 beneath segments 52 to lock plug 47 in its original position closing the lower end of tube 45. After this, further removal of tube 45 from barrel 11 as shown in Figure 6 unseats plug 47 from crosshead 22 and the magazine can be safely withdrawn to be returned to the darkroom for unloading and development of the exposed film S.

I claim:

1. An oscillograph for recording a plurality of electrical signals in side-by-side relationship on a sheet of photosensitive material which includes a slide mount, an optical system including a light projector and a mirror galvanometer, said optical system being slidably mounted on said slide mount for movement along the length thereof, a barrel positioned about and enclosing said slide mount and optical system, means for positioning a sheet of photosensitive material about the inner surface of said barrel in fixed relation therewith, said mirror galvanometer being adapted for connection to an electrical signal to be recorded and positioned to intercept a beam of light projected by said light projector to direct said beam of light toward said sheet at the inner surface of said barrel, means for rotating said barrel about said slide mount and optical system, and means for moving said optical system lengthwise on said slide mount to any predetermined position thereon.

2. An oscillograph according to claim 1 which is further provided with means for rotating said optical system within said barrel.

3. An oscillograph for recording a plurality of electrical signals in side-by-side relationship on a sheet of photosensitive material which includes a fixed base, a pair of upright slide rods mounted parallel to each other on said base, a crosshead fixedly secured to the upper ends of said slide rods, an optical system including a light projector and a mirror galvanometer, said optical system being slidably mounted on said slide rods for movement along the length thereof between said crosshead and said base, an upright barrel rotatably mounted on said base positioned about and enclosing said slide rods, crosshead and optical system, means for positioning said sheet of photosensitive material about the inner surface of said barrel in fixed relation therewith, said mirror galvanometer being adapted for connection to an electrical signal to be recorded and positioned to intercept a beam of light projected by said light projector to direct said beam of light toward said sheet at the inner surface of said barrel, means for rotating said barrel on said base about said slide rods, crosshead and optical system, and means for moving said optical system lengthwise on said slide rods to any predetermined position between said base and said crosshead.

4. An oscillograph according to claim 3 in which said slide rods are mounted on said base for rotation thereon within said barrel and which further includes means for rotating said slide rods within said barrel.

5. An oscillograph according to claim 3 in which said barrel has an open upper end, and in which said means for positioning a sheet of photosensitive material includes a tubular magazine slidably received in said barrel about said slide rods, crosshead and optical system, said magazine being adapted to receive a said sheet of photosensitive material affixed about the inner surface of said magazine and having a detachable end closure adjacent one end of said magazine and a said sheet, said end closure being slidable through said magazine over a said sheet toward the other end of said magazine and a said sheet, means for engaging said detachable end closure with said crosshead at a position of said magazine in which one end of said magazine is inserted into the open upper end of said barrel, means for sliding said detachable end closure in engagement with said crosshead through said magazine as said magazine is moved from said position to another position more fully received in said barrel, and means for engaging said magazine with said barrel at said more fully received position.

6. In an oscillograph including a barrel having an open end, the improvement which includes means for positioning a sheet of photosensitive material in said barrel, said means including a tubular magazine slidably received in the open end of said barrel, said magazine being adapted to receive a said sheet of photosensitive material affixed about the inner surface of said magazine and having a detachable end closure adjacent one end of said magazine and a said sheet, said end closure being slidable through said magazine over a said sheet toward the other end of said magazine and a said sheet, means for engaging said detachable end closure at a position of said magazine in which one end of said magazine is inserted into the open end of said barrel, means for sliding said detachable end closure in said engagement through said magazine as said magazine is moved from said position to another position more fully received in said barrel, and means for engaging said magazine with said barrel at said more fully received position.

References Cited in the file of this patent

UNITED STATES PATENTS

| | | |
|---|---|---|
| 1,104,556 | Schou | July 21, 1914 |
| 2,293,349 | Martin et al. | Aug. 18, 1942 |
| 2,590,313 | Hartmann | Mar. 25, 1952 |
| 2,803,515 | Begun et al. | Aug. 20, 1957 |